(12) United States Patent
Honda

(10) Patent No.: US 11,798,597 B2
(45) Date of Patent: Oct. 24, 2023

(54) INFORMATION OUTPUT APPARATUS, INFORMATION OUTPUT METHOD AND DESIGN SUPPORT SYSTEM

(71) Applicant: Geocreates, Inc., Tokyo (JP)

(72) Inventor: Tsukasa Honda, Tokyo (JP)

(73) Assignee: GEOCREATES, INC., Tokyo (JP)

( * ) Notice: Subject to any disclaimer, the term of this patent is extended or adjusted under 35 U.S.C. 154(b) by 0 days.

(21) Appl. No.: 17/167,604

(22) Filed: Feb. 4, 2021

(65) Prior Publication Data

US 2021/0249050 A1  Aug. 12, 2021

Related U.S. Application Data

(63) Continuation of application No. PCT/JP2019/031576, filed on Aug. 9, 2019.

(30) Foreign Application Priority Data

Aug. 9, 2018 (JP) ................... 2018-150679

(51) Int. Cl.
*G11B 27/34* (2006.01)
*G06F 3/01* (2006.01)

(52) U.S. Cl.
CPC ............ *G11B 27/34* (2013.01); *G06F 3/012* (2013.01); *G06F 3/013* (2013.01); *G06F 3/015* (2013.01)

(58) Field of Classification Search
CPC ......... G11B 27/34; G06F 3/012; G06F 3/013; G06F 3/015
See application file for complete search history.

(56) References Cited

U.S. PATENT DOCUMENTS

2015/0189266 A1* 7/2015 Zhou ................. H04N 13/271
  348/54
2015/0309316 A1* 10/2015 Osterhout ............ G06F 3/0488
  345/8

(Continued)

FOREIGN PATENT DOCUMENTS

JP  2003-186904 A  7/2003
JP  2011-145979 A  7/2011

(Continued)

OTHER PUBLICATIONS

International Search Report, PCT/JP2019/031576, dated Oct. 8, 2019, with English translation, 5 pages.

(Continued)

*Primary Examiner* — Sunghyoun Park
(74) *Attorney, Agent, or Firm* — Rankin, Hill & Clark LLP

(57) ABSTRACT

An information output apparatus (3) includes an acquisition unit (341) that acquires detection information indicating a detection state of a predetermined reaction of a user when the user views a predetermined space which is a virtual reality space or an augmented reality space, and an output unit (342) that outputs information indicating the predetermined space and the detection information acquired by the acquisition unit (341) in association with each other. The acquisition unit (341) acquires detection information in which (i) the detection state of the predetermined reaction when the user watches the video showing the predetermined space and (ii) information indicating a playback position of the video are associated with each other, and the output unit (342) outputs information indicating the detection state of the predetermined reaction for each playback position of the video.

19 Claims, 9 Drawing Sheets

(56) References Cited

U.S. PATENT DOCUMENTS

| | | | | |
|---|---|---|---|---|
| 2016/0147301 A1* | 5/2016 | Iwasaki | ................... | G06F 3/013 |
| | | | | 345/157 |
| 2017/0238831 A1* | 8/2017 | Cho | ........................ | G06F 3/015 |
| 2018/0095635 A1* | 4/2018 | Valdivia | .................... | G06F 3/02 |
| 2018/0136725 A1* | 5/2018 | Hurst | ..................... | G06F 3/011 |
| 2018/0373328 A1 | 12/2018 | Sawaki | | |

FOREIGN PATENT DOCUMENTS

| | | |
|---|---|---|
| JP | 2012-104037 A | 5/2012 |
| JP | 6298561 B1 | 3/2018 |
| JP | 2018-097437 A | 6/2018 |

OTHER PUBLICATIONS

Written Opinion, PCT/JP2019/031576 dated Oct. 8, 2019, with English translation, 12 pages.

Fast entrainment of human electroencephalogram to a theta-band photic flicker during successful memory encoding, Naoyuki Sato, frontiers in Human Neuroscience, Original Research Article, Published May 17, 2013, doi: 10.3389/fnhum.2013.00208, 11 pages.

\* cited by examiner

INFORMATION OUTPUT APPARATUS, INFORMATION OUTPUT METHOD AND DESIGN SUPPORT SYSTEM

CROSS-REFERENCE TO RELATED APPLICATIONS

The present application is a continuation application of International Application number PCT/JP2019/031576, filed on Aug. 9, 2019, which claims priority under 35 U.S.C § 119(a) to Japanese Patent Application No. 2018-150679, filed on Aug. 9, 2018. The contents of these applications are incorporated herein by reference in their entirety.

BACKGROUND OF THE INVENTION

The present disclosure relates to an information output apparatus, a design support system, and an information output method for outputting information about a user who views a virtual reality space.

Conventionally, when working on a layout design of a building, a designer and users design layouts by exchanging information back and forth. For example, Japanese Unexamined Patent Application Publication No. 2011-145979 discloses a layout design support apparatus that makes a user view a virtual reality space corresponding to a layout for a floor space of a building and accepts a change operation of the layout in the virtual reality space from the user. The layout design support apparatus analyzes tendencies of the layout changes on the basis of the change operation of the layout, and specifies a recommended layout mode.

Incidentally, a user of a building lives while recognizing buildings and cities on a daily basis, and has life experiences in various types of spaces such as open spaces and stable spaces. The user recognizes a space on the basis of his/her individual experiences. For example, the user recognizes a sense of openness and a sense of security accompanying a space on the basis of his/her individual experiences.

In recent years, designing is carried out while reflecting the user's perception of a space. For this reason, it is necessary to enable a user to specify his/her perception of a space. However, the layout design support apparatus described in Japanese Unexamined Patent Application Publication No. 2011-145979 merely specifies the recommended layout mode on the basis of the user's layout change operations, and cannot specify the user's perception of a space.

BRIEF SUMMARY OF THE INVENTION

The present disclosure focuses on this point, and its object is to enable grasping of the user's perception of a space.

An information output apparatus according to a first aspect of the present disclosure includes an acquisition unit that acquires detection information in which (i) a detection state of a predetermined reaction of a user when the user watches a video showing a predetermined space which is a virtual reality space or an augmented reality space and (ii) information indicating a playback position of the video are associated with each other; and an output unit that outputs (i) the video showing the predetermined space and (ii) the detection information indicating the detection state of the predetermined reaction for each playback position of the video in association with each other.

An information output method according to a second aspect of the present disclosure includes acquiring detection information in which (i) a detection state of a predetermined reaction of a user when the user watches a video showing a predetermined space which is a virtual reality space or an augmented reality space and (ii) information indicating a playback position of the video are associated with each other; and outputting (i) the video showing the predetermined space and (ii) the detection information indicating the detection state of the predetermined reaction for each playback position of the video, that are executed by a computer.

A design support system according to a third aspect of the present disclosure includes a display apparatus worn by a user; and an information output apparatus, wherein the display apparatus has a display unit, a display control unit that causes the display unit to display a predetermined space which is a virtual reality space or an augmented reality space, and a detection information generating unit that generates detection information in which (i) a detection state of a predetermined reaction of the user when the user watches a video showing the predetermined space and (ii) information indicating a playback position of the video are associated with each other, and the information output apparatus has an acquisition unit that acquires the detection information generated by the detection information generating unit, and an output unit that outputs (i) the video showing the predetermined space and (ii) the detection information indicating the detection state of the predetermined reaction for each playback position of the video in association with each other.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

First Embodiment

[Outline of a Design Support System S]

Figure 1:
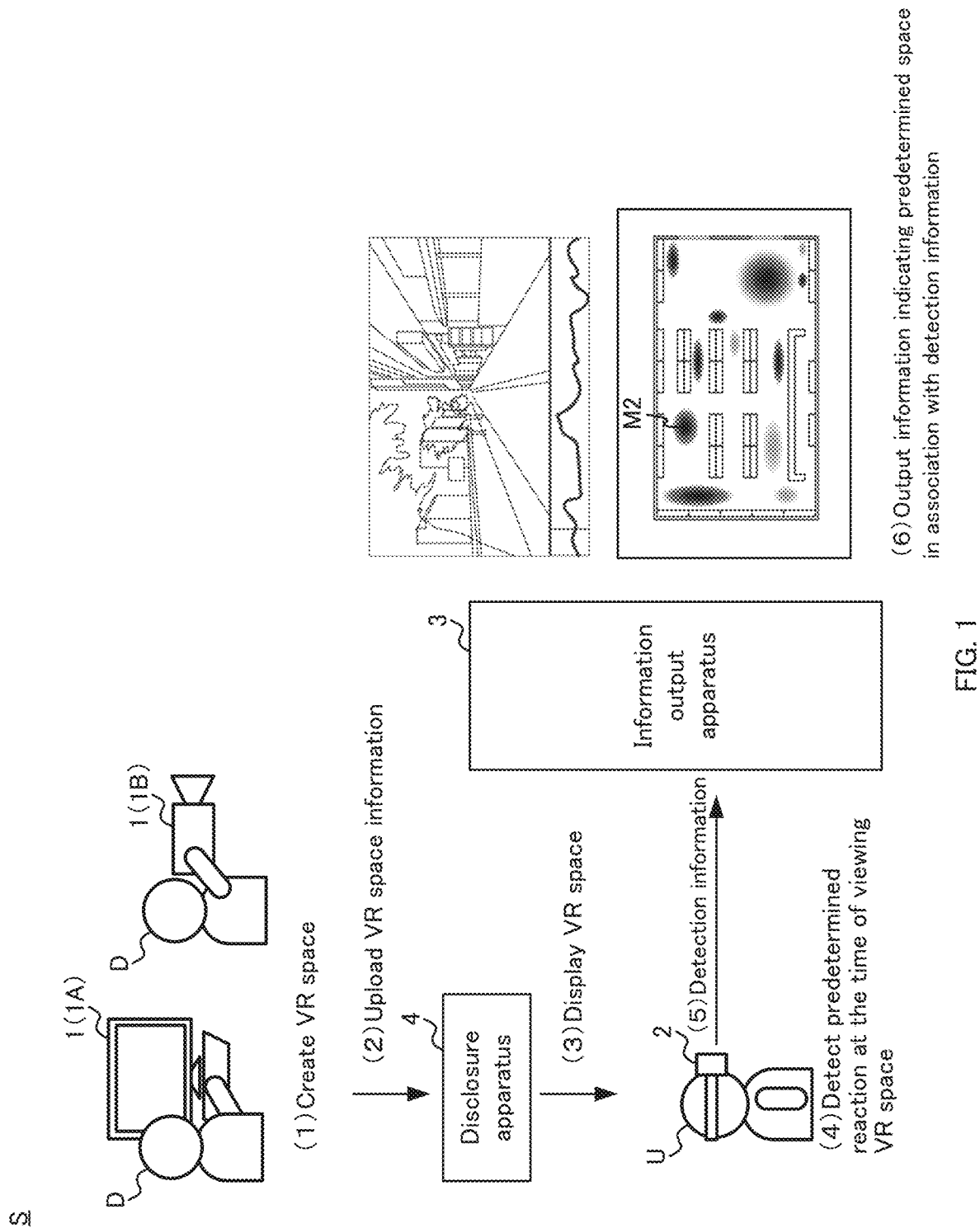
FIG. 1 shows an outline of a design support system according to a first embodiment.

FIG. 1 shows an outline of a design support system S according to a first embodiment. The design support system S includes a generating apparatus 1, a display apparatus 2, and an information output apparatus 3, and is a system for supporting the designing of a space related to a building.

In the first embodiment, the generating apparatus 1 is a computer 1A or an image capturing apparatus 1B, for example. A designer D who designs the space creates a model of the virtual reality space as information indicating the virtual reality space or a video (moving image) showing the virtual reality space by operating the generating apparatus 1 (see (1) illustrated in FIG. 1). The model of the virtual reality space and the video showing the virtual reality space each correspond to an actual space or a space to be designed. The video showing the virtual reality space is, for example, a video relating to virtual reality contents such as virtual reality contents that enable an experience of freely looking around while being still or moving in the virtual reality space, and a 360-degree viewable video or a 180-degree viewable video which makes it possible to experience an experience similar to the aforementioned experience. It should be noted that in the following description, the virtual reality space is referred to as a VR space, the model of the virtual reality space is referred to as a VR model, and the video showing the virtual reality space is referred to as a VR video. Also, the VR model and the VR video are collectively referred to as VR information. The generating apparatus 1 uploads the VR information to a disclosure apparatus 4 that releases the VR information to the public, for example (see (2) illustrated in FIG. 1).

The display apparatus 2 is a wearable device, such as VR goggles, a VR headset, or the like, that allows a user to browse the VR space, for example. The VR goggles or the VR headset may be an assembly type VR goggles or VR headset for causing a smart phone or the like to function as the VR goggles. A user U, who is a user of the space or a subject person to be examined in the space, operates the display apparatus 2 to display the VR space indicated by the VR information uploaded to the disclosure apparatus 4 on a display unit of the display apparatus 2 (see (3) illustrated in FIG. 1). Then, the user U wears the display apparatus 2 and views the VR space displayed on the display unit of the display apparatus 2. The display apparatus 2 detects a predetermined reaction of the user U while he/she is viewing the VR space (see (4) illustrated in FIG. 1). The predetermined reaction may be a looking-around motion or a gazing motion of the user U, or the generation of θ waves in the user U. The display apparatus 2 may be a personal computer. In this case, it is assumed that a device capable of detecting the θ waves among brain waves of the user U is connected to the display apparatus 2. The display apparatus 2 may detect the predetermined reaction on the basis of a detection of the generation of θ waves with the device.

The display apparatus 2 may detect the θ waves in a state where the device capable of detecting θ waves among the user U's brain waves is not connected. By forming a database of computer operations which are performed by the user U, who is viewing the VR space, when the θ waves are detected, the display apparatus 2 may determine that the θ waves are generated when the user U performs a computer operation that is likely to be performed at a point in time when the θ waves are detected, for example.

The information output apparatus 3 is a portable terminal such as a smart phone or a computer, for example. The information output apparatus 3 acquires, from the display apparatus 2, detection information indicating a detection state of the user U's predetermined reaction when the user U views the VR space (see (5) illustrated in FIG. 1). The information output apparatus 3 outputs, as recognition result information indicating a result of a space recognition of the user U, information in which (i) information indicating a predetermined space and (ii) the acquired detection information are associated with each other (see (6) illustrated in FIG. 1). For example, as shown in FIG. 1, the information output apparatus 3 displays, as the recognition result information, video information indicating the VR video in association with information indicating the detection state of the predetermined reaction at each playback position of the VR video, or displays the recognition result information indicating the detection state of the predetermined reaction on a map showing the VR space.

It is considered that the user U is trying to recognize a space, projected in the VR space, where the user U would move to at a timing when he/she made the predetermined reaction in the VR space, in other words, at a timing of the looking-around motion, the gazing motion, or the detection of θ waves in the VR space. Therefore, the predetermined reaction is a reaction in which the user U attempts to recognize the space.

Further, when the looking-around motion, the gazing motion, or the θ waves of the user U is detected, it is considered that the user U is advancing while recognizing that the user himself/herself exists in the space which he/she has recognized, or it is considered that the user U is advancing while recognizing that the space he/she recognizes is in front of his/her line of sight and the user himself/herself does not exist in that space. In addition, when the user U's looking-around motion, gazing motion, or θ waves is not detected, it is considered that the user U is advancing while recognizing that the user himself/herself does not exist in the space which he/she recognizes. Therefore, the designer D can grasp the user U's perception of a space included in the VR space by confirming the recognition result information in which the VR space information output by the information output apparatus 3 and the detection information acquired by the information output apparatus 3 are associated. In this manner, the designer D can evaluate the actual space or the space to be designed corresponding to the VR space, and can use the evaluation for designing the space. Hereinafter, configurations of the display apparatus 2 and the information output apparatus 3 will be described.

[Configuration Example of the Display Apparatus 2]

Figure 2:
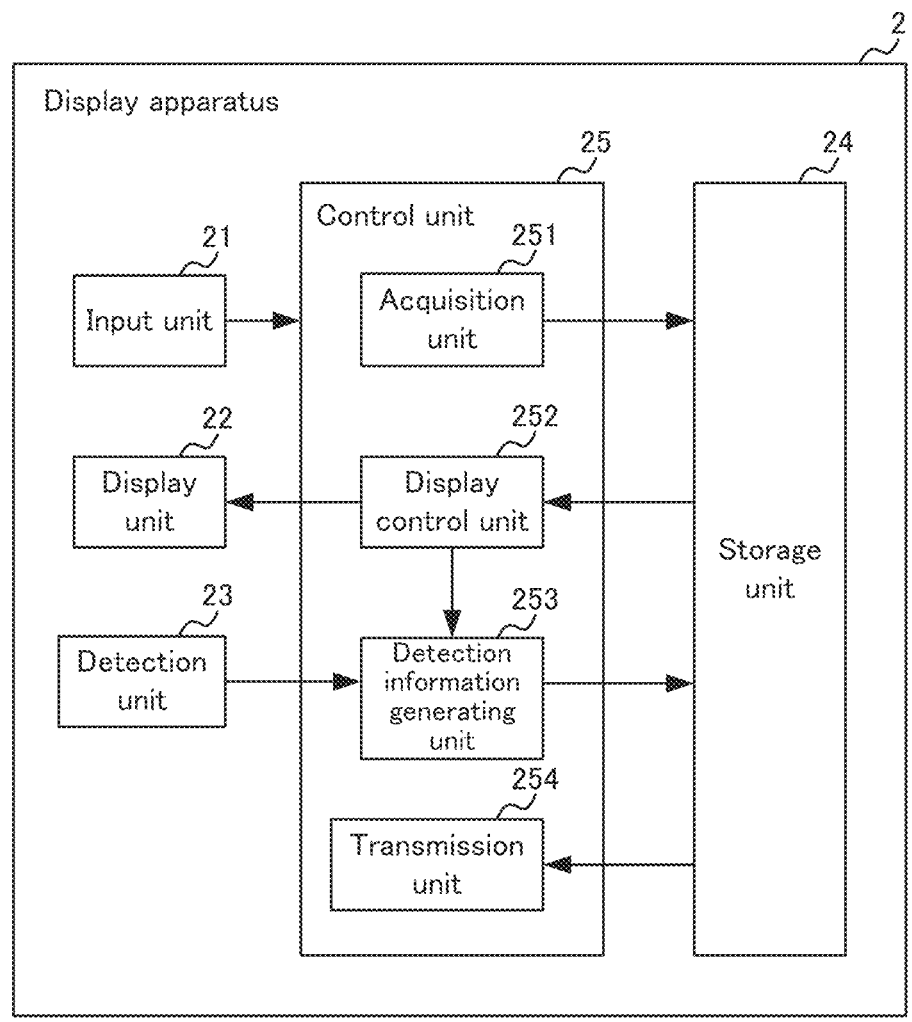
FIG. 2 shows a configuration of a display apparatus according to the first embodiment.

First, a configuration of the display apparatus 2 will be described. FIG. 2 shows the configuration of the display apparatus 2 according to the first embodiment. The display apparatus 2 includes an input unit 21, a display unit 22, a detection unit 23, a storage unit 24, and a control unit 25.

The input unit 21 includes, for example, a button or a contact sensor or the like disposed to be superimposed on the display unit 22, and accepts an operation input from a user of the display apparatus 2. The display unit 22 includes, for example, a liquid crystal display, an organic electro-luminescence (EL) display, or the like. The display unit 22 displays various types of information in accordance with control of the control unit 25. The detection unit 23 is a three-dimensional accelerometer, for example, and detects acceleration applied to the display apparatus 2. When detecting the acceleration, the detection unit 23 outputs information indicating the detected acceleration rate to the control unit 25.

The storage unit 24 is, for example, a read only memory (ROM), a random access memory (RAM), or the like. The storage unit 24 stores various types of programs for causing the display apparatus 2 to function. For example, the storage unit 24 stores a program that causes the control unit 25 of the display apparatus 2 to function as an acquisition unit 251, a display control unit 252, a detection information generating unit 253, and a transmission unit 254, which will be described below.

The control unit 25 is, for example, a central processing unit (CPU). The control unit 25 controls the functions of the display apparatus 2 by executing various types of programs stored in the storage unit 24. By executing the programs stored in the storage unit 24, the control unit 25 functions as the acquisition unit 251 serving as a spatial information acquisition unit, the display control unit 252, the detection information generating unit 253, and the transmission unit 254. Details of these functions will be described below.

When the display apparatus 2 is a personal computer, it is assumed that (i) a device, worn on the head of the user U, which detects an acceleration rate applied to the head of the user U, or (ii) a device that detects the user U's brain waves (θ waves) is connected to the display apparatus 2.

[Configuration Example of the Information Output Apparatus 3]

Figure 3:
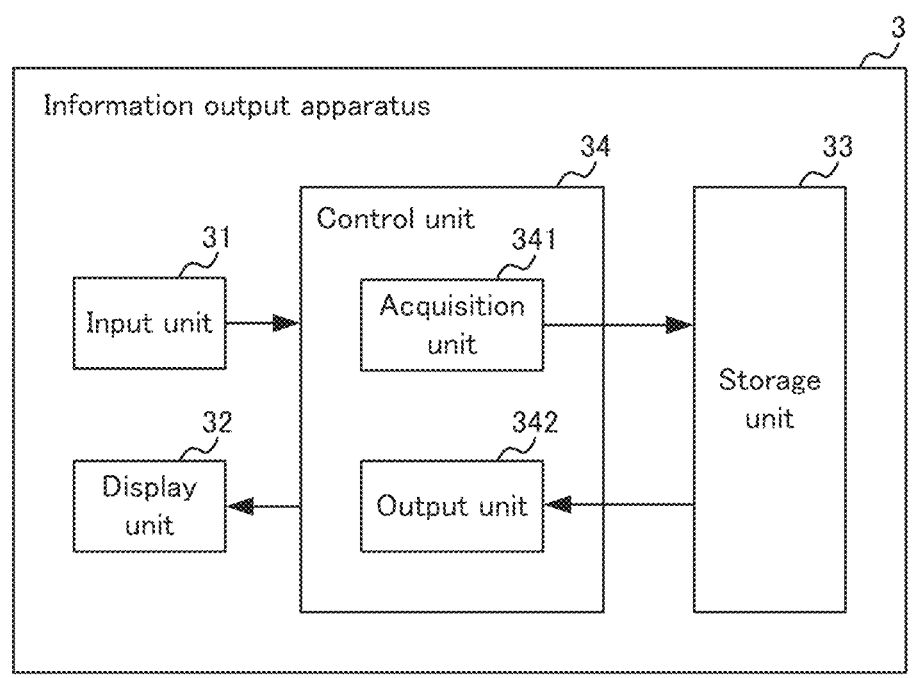
FIG. 3 shows a configuration of an information output apparatus according to the first embodiment.

Next, a configuration of the information output apparatus 3 will be described. FIG. 3 shows the configuration of the information output apparatus 3 according to the first embodiment.

The information output apparatus 3 includes an input unit 31, a display unit 32, a storage unit 33, and a control unit 34. The input unit 31 includes, for example, a button or a contact sensor or the like disposed to be superimposed on the display unit 32, and accepts an operation input from a user of the information output apparatus 3. The display unit 32 includes, for example, the liquid crystal display, the organic EL display, or the like. The display unit 32 displays various types of information in accordance with control of the control unit 34.

The storage unit 33 is, for example, the ROM, the RAM, or the like. The storage unit 33 stores various types of programs that cause the information output apparatus 3 to function. For example, the storage unit 33 stores an information output program for causing the control unit 34 of the information output apparatus 3 to function as an acquisition unit 341 and an output unit 342, which will be described below.

The control unit 34 is the CPU, for example. The control unit 34 controls the functions of the information output apparatus 3 by executing various types of programs stored in the storage unit 33. The control unit 34 functions as the acquisition unit 341 and the output unit 342 by executing the information output program stored in the storage unit 33.

[Processing of Outputting the Recognition Result Information]

Figure 4:
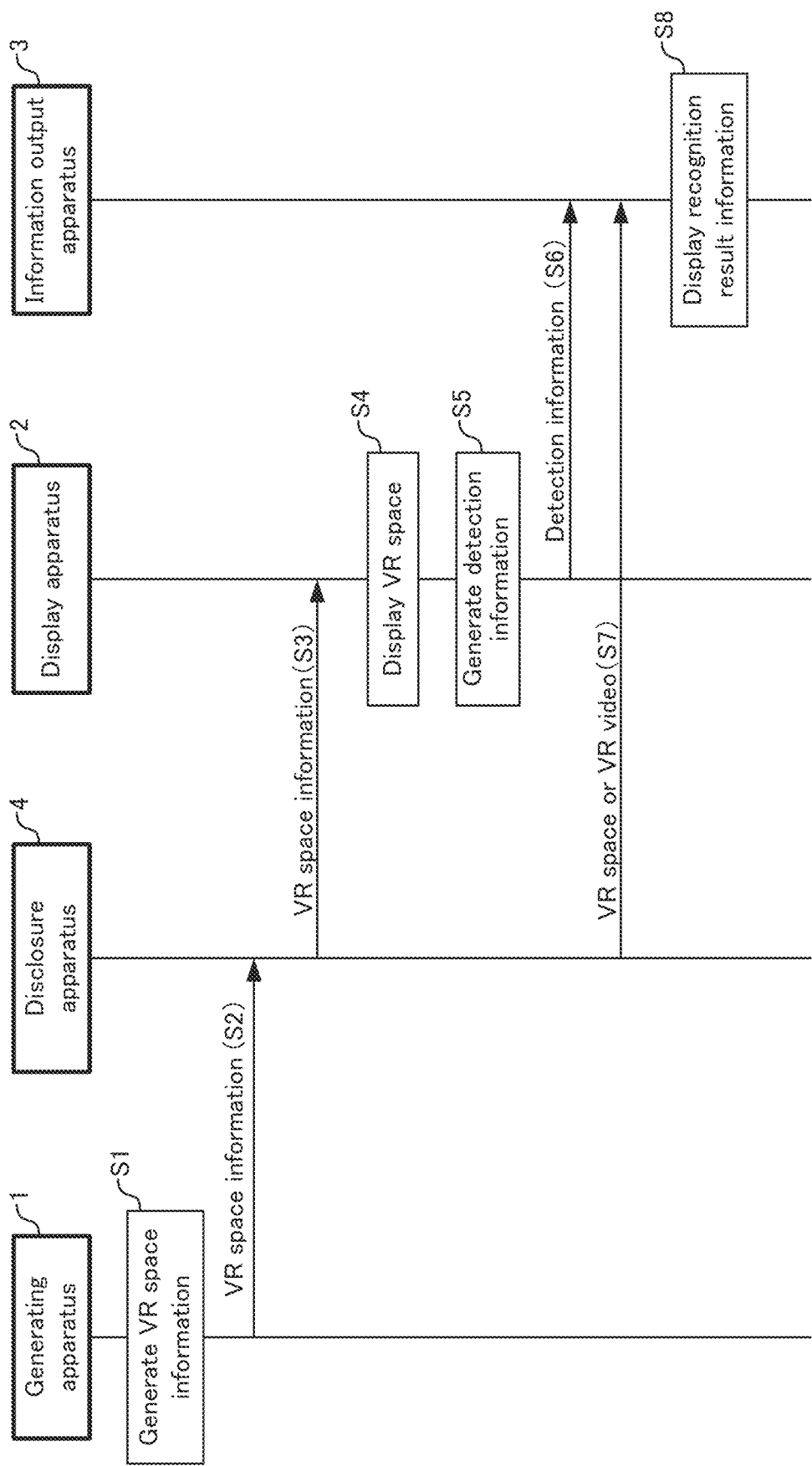
FIG. 4 is a sequence diagram showing processing until the information output apparatus according to the first embodiment outputs recognition result information.

Hereinafter, functions of the control unit 25 and functions of the control unit 34 will be described by referencing a sequence diagram showing processing of how the information output apparatus 3 outputs the recognition result information in which the VR space information and the acquired detection information are associated. FIG. 4 is a sequence diagram showing processing up until the information output apparatus 3 according to the first embodiment outputs the recognition result information.

First, the generating apparatus 1 generates a VR space model or a VR video as VR space information in response to an operation performed by the designer D (S1). It should be noted that the generating apparatus 1 generates the VR space model or the VR video, but it is not limited to this. The generating apparatus 1 may generate, as the VR space information, a plurality of still images corresponding to the VR space indicated by the VR space model, a video, or a plurality of still images indicating a part of the VR video. The generating apparatus 1 uploads the generated VR space information to the disclosure apparatus 4 in response to the operation performed by an operator of the generating apparatus 1 (S2). Here, when the VR space information is the VR video, the generating apparatus 1 may upload the VR video to a video sharing website.

Next, when the input unit 21 accepts an operation for acquiring the VR space information, the acquisition unit 251 of the display apparatus 2 acquires the VR space information generated by the generating apparatus 1 from the disclosure apparatus 4 (S3). It should be noted that the acquisition unit 251 acquires the VR space information from the disclosure apparatus 4, but it is not limited to this. The acquisition unit 251 may acquire the VR space information from the generating apparatus 1 via a storage medium such as an SD (a registered trademark) card.

Next, the display control unit 252 of the display apparatus 2 causes the display unit 22 to display the VR space indicated by the acquired VR space information (S4). It should be noted that the display control unit 252 may cause the display unit 22 to display a VR space shown by VR space information stored in an external device while receiving this VR space information from the external device.

Next, the detection information generating unit 253 of the display apparatus 2 generates detection information indicating a detection state of a predetermined reaction to the VR space of the user U who wears the display apparatus 2 and views the VR space (S5). The predetermined reaction is the looking-around motion, the gazing motion, or the generation of θ waves as described above, and hereinafter, the descriptions will be given focusing on the case of detecting the looking-around motion or the gazing motion.

The detection information generating unit 253 generates, as detection information indicating the predetermined reaction, detection information indicating a detection state of the looking-around motion and the gazing motion of the user U who is viewing the VR space. The looking-around motion is a head-swinging motion in which the user U swings his/her head in a predetermined direction when the user U views the VR space. The predetermined direction is horizontal to the ground and perpendicular to an advancing direction, for example. The gazing motion is an act of the user U gazing at the VR space for more than a certain period of time. Hereinafter, the descriptions will proceed with the predetermined direction being referred to as a horizontal direction.

The looking-around motion is likely to be detected in a case of a "selecting state", indicating a state in which the user U is searching for information about a place he/she wants to go to, for example. The gazing motion is likely to be detected in a case of an "advancing state", indicating a state in which an advancing direction of the user U is determined since he/she has found the information about the place where he/she wants to go to, and in a case of an "arriving state" which indicates that the user U is directly looking at and advancing to the place where he/she wants to go to, for example. For this reason, the detection information generating unit 253 may classify the predetermined reaction depending on which state the looking-around motion belongs to among the "selecting state," "advancing state," and "arriving state". Further, the detection information generating unit 253 may specify the predetermined reaction on the basis of only an element among three elements, i.e., "selecting state," "advancing state," and "arriving state" according to the configuration of a building or a user's purpose. In this manner, the detection information generating unit 253 can classify and quantify the user's exploratory behavior, using the looking-around motion.

The detection information generating unit 253 specifies the advancing direction on the basis of the acceleration rate indicated with acceleration information output from the detection unit 23, for example. The detection information generating unit 253 then determines a state where the acceleration rate in the horizontal direction among the acceleration rates indicated by the acceleration information exceeds a first threshold as the detection state of the looking-around motion. Also, the detection information generating unit 253 determines, as the detection state of the gazing motion, a state where the acceleration rate in the horizontal direction indicated by the acceleration information is less than a predetermined threshold for more than a certain period of time. It should be noted that the detection information generating unit 253 may also determine, as the detection state of the looking-around motion, a state where an acceleration rate in a vertical direction among the acceleration rates indicated by the acceleration information exceeds a second threshold. In this manner, the detection information generating unit 253 can detect a looking up of an open ceiling space in a building or a tall building, as the looking-around motion.

Cases where the detection information generating unit 253 detects the looking-around motion and the gazing motion on the basis of the acceleration rate indicated by the acceleration information output from the detection unit 23 were illustrated as examples, but the present disclosure is not limited to these cases. The detection information generating unit 253 may detect the looking-around motion and the gazing motion on the basis of a change of a region in the VR space the user U views.

When the user U views the VR space indicated by the VR space model, the detection information generating unit 253 causes the storage unit 24 to store, as the detection information, information in which (i) position information indicating a position of the user U in the VR space and (ii) acceleration information indicating the acceleration rate in the horizontal direction indicating the detection state of the looking-around motion or the gazing motion at each position are associated with each other.

In addition, when the user U watches the VR video, the detection information generating unit 253 causes the storage unit 24 to store, as the detection information, information in which (i) playback position information indicating each playback position in the VR video and (ii) acceleration information indicating the acceleration rate in the horizontal direction, which indicates the detection state of the looking-around motion or the gazing motion at each playback position, are associated with each other.

It should be noted that the detection information generating unit 253 may detect that the user U made the looking-around motion when the acceleration rate in the horizontal direction is equal to or greater than a predetermined amount, and may detect that the user U made the gazing motion when the acceleration rate in the horizontal direction is less than a predetermined threshold value for more than a certain period of time. The detection information generating unit 253 may specify the position of the VR space or the playback position of the VR video when the looking-around motion or the gazing motion of the user U is detected, and cause the storage unit 24 to store, as the detection information, information in which (i) the detection state at the time when the looking-around motion or the gazing motion is detected and (ii) the position information indicating the position of the VR space or the playback position information indicating the playback position of the VR video are associated with each other.

For example, it is assumed that the detection information includes space identification information for identifying the VR space information (the VR space model or the VR video) corresponding to a VR space being browsed by the user U, type information indicating types of motions (the looking-around motion and the gazing motion) of the user U, and a user ID for identifying the user U. The space identification information is a name of a building or the like corresponding to the VR space indicated by the VR space information, for example, and is set by the designer D. It should be noted that the VR space information may be viewed by a plurality of users U. In this case, the detection information generating unit 253 generates detection information corresponding to each of the plurality of users U.

It should be noted that the looking-around motion is the head-swigging motion in which the user U turns the head in a predetermined direction when the user U views the VR space, but it is not limited to this. For example, the looking-around motion may be a user's line-of-sight movement having a predetermined pattern when the user views the VR space. In this case, it is assumed that the display apparatus 2 is provided with a line-of-sight detection sensor for detecting the user U's line of sight. The detection information generating unit 253 detects that a pattern of the user U's line of sight output from the line-of-sight detection sensor is the predetermined pattern. Here, the predetermined pattern is, when the advancing direction is 0 degrees, a pattern indicating that a line of sight moves to a direction in a first predetermined angle range (e.g., 60 degrees to 120 degrees) first and then moves to a direction in a second predetermined angle range (e.g., −60 degrees to −120 degrees) within a predetermined time, or a pattern indicating that the line of sight moves to the direction of the second predetermined angle range first and then moves to the first predetermined angle range within a predetermined time. This predetermined pattern is referred to as saccade.

The detection information generating unit 253 may specify the position of the VR space or the playback position of the VR video when the user U makes the head-swinging motion and his/her line-of-sight pattern indicates the saccade. The detection information generating unit 253 may further causes the storage unit 24 to store, as the detection information, information in which (i) a detection state of the looking-around motion when the head-swinging motion is made and the line-of-sight pattern indicates the saccades and (ii) the position information indicating the position of the VR space or the playback position information indicating the playback position of the VR video are associated with each other. By considering the detection state of the saccade, the display apparatus 2 can detect the timing at which the user U tries to recognize the space shown in the VR space where he/she would move to with higher accuracy than in a case where only the head-swinging motion is used.

The detection information generating unit 253 causes the storage unit 24 to store the detection information including the position information indicating the position of the VR space or the playback position information indicating the playback position of the VR video when the predetermined reaction is detected, but it is not limited thereto. For example, the detection information generating unit 253 may include, as a screen shot, an image showing the VR space or a display image of the VR video which the display control unit 252 was displaying when the predetermined reaction was detected in the detection information. Also, the detection information generating unit 253 may include, in the detection information, a video or a VR video that shows the VR space for a predetermined period including a timing at which the predetermined reaction is detected.

Also, in order to detect the generation of θ waves, which is an example of the predetermined reaction, the display apparatus 2 may include a brainwave detection unit that detects brain waves of a user who wears the display apparatus 2. The detection information generating unit 253 may generate detection information indicating a detection state of brain waves when the user U views the VR space, as the detection information indicating the detection state of the predetermined reaction. When the display apparatus 2 includes the brainwave detection unit, the display apparatus 2 does not need to include the detection unit 23.

In this case, the detection information generating unit 253 specifies the position of the VR space or the playback position of the VR video when the θ waves, which are a type of brain waves, are detected. The detection information generating unit 253 causes the storage unit 24 to store, as the detection information, information in which (i) the detection state of the θ waves and (ii) the position information indicating the position of the VR space or the playback position information indicating the playback position of the VR video are associated with each other.

It should be noted that the predetermined reaction may be a state where the user U's line-of-sight pattern corresponds to the predetermined pattern and the user is in a perspiring state. Further, the predetermined reaction may be a state where the user U's line-of-sight pattern corresponds to the predetermined pattern, the user is in the perspiring state, and the θ waves are detected. For example, the display apparatus 2 may include, in order to detect perspiration of the user, a perspiration detection unit that detects perspiration of the user wearing the display apparatus 2. Then, the detection information generating unit 253 may generate detection information indicating the perspiring state of the user U when he/she views the VR space, as the detection information indicating the detection state of the predetermined reaction. Here, when the display apparatus 2 is provided with the perspiration detection unit, the display apparatus 2 does not need to include the detection unit 23.

Next, the transmission unit 254 of the display apparatus 2 transmits one or more pieces of detection information indicating the detection state of the predetermined reaction to the information output apparatus 3 when one or more users U view the VR space (S6). Specifically, first, the acquisition unit 341 of the information output apparatus 3 transmits an acquisition request for requesting acquisition of the detected information to the display apparatus 2. Upon receiving the acquisition request for the detection information from the information output apparatus 3, the transmission unit 254 of the display apparatus 2 transmits one or more pieces of detection information stored in the storage unit 24 to the information output apparatus 3.

The acquisition unit 341 of the information output apparatus 3 receives from the display apparatus 2 one or more pieces of detection information indicating the detection state of a predetermined reaction of the user U when the user U views the VR space, thereby acquiring detection information corresponding to each of the one or more users U, and acquires VR space information corresponding to the detection information from the disclosure apparatus 4 (S7). When the user views the VR space corresponding to the VR space model, the acquisition unit 341 acquires determination information including both the position information indicating the position of the VR space when the predetermined reaction is detected and the information indicating the detection state of the predetermined reaction. Also, when the user U watches the VR video, the acquisition unit 341 acquires detection information including both the playback position information indicating the playback position of the VR video when the predetermined reaction is detected and the information indicating the detection state of the predetermined reaction.

The acquisition unit 341 causes the storage unit 33 to store the recognition result information indicating the result of spatial recognition of the user U, in which the VR space information and the detection information are associated with each other. For each of the plurality of pieces of VR space information, the acquisition unit 341 causes the storage unit 33 to store the recognition result information in which the VR space information is associated with the acquired detection information.

The output unit 342 associates the VR space information with the detection information acquired by the acquisition unit 341, and outputs these pieces of information as the recognition result information indicating the result of the spatial recognition of the user U. For example, the output unit 342 causes the display unit 32 to display the recognition result information stored in the storage unit 33 in response to accepting the display operation of the recognition result information via the input unit 31 (S8).

[Display Examples of the Recognition Result Information of One User]

FIGS. 5A to 5D each show a display example of the recognition result information of a single user. Here, the display examples of the recognition result information when the user watches the VR video as the VR space indicated by the VR space information will be described. Also, the display examples of the recognition result information will be described assuming that the predetermined reaction is the looking-around motion.

Figure 5A:
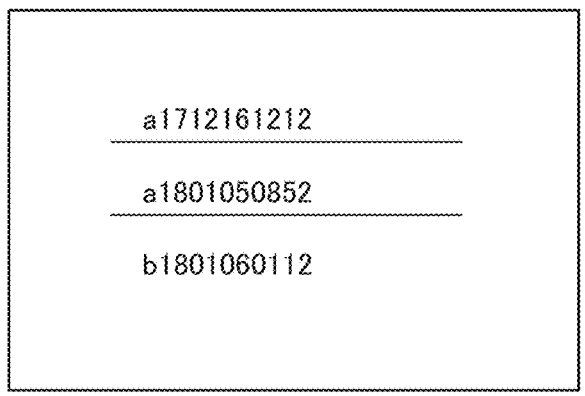
FIGS. 5A to 5D each show a display example of the recognition result information of a single user.

For example, as shown in FIG. 5A, the output unit 342 displays the user IDs included in the detection information stored in the storage unit 33 on the display unit 32 and accepts the selection of a user ID via the input unit 31. In the example shown in FIG. 5A, three user IDs are displayed, and the output unit 342 accepts the selection of one of the three user IDs.

Figure 5B:
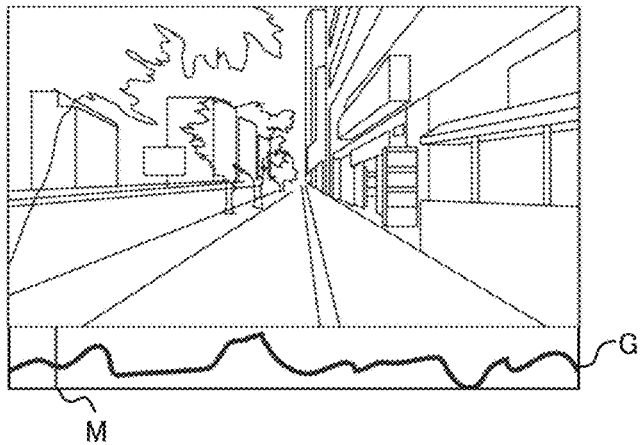

Upon accepting the selection of one user ID, the output unit 342 specifies the VR video corresponding to the space identification information included in the detection information corresponding to that user ID. Then, the output unit 342 outputs information indicating the detected state of the looking-around motion for each playback position of the specified VR video. Specifically, as shown in FIG. 5B, the output unit 342 replays the specified VR video and displays it on the display unit 32, and causes the display unit 32 to display a graph G, which is information indicating the detected state of the looking-around motion at each of the playback positions of the VR video, and a playback position mark M, which is information indicating the current playback position of the VR video. Here, the horizontal axis of the graph G indicates the playback position of the VR video, and the vertical axis indicates the magnitude of the acceleration rate in the horizontal direction. It should be noted that, when the display apparatus 2 detects the θ waves instead of the looking-around motion, then the vertical axis of the graph G indicates the detection state of θ waves.

The output unit 342 may extract a still image at predetermined intervals (e.g., every 1 second or every 3 seconds) from the specified VR video, and display the still image on the display unit 32. In addition, the output unit 342 may extract a still image corresponding to a position where the user who watched the VR video stood still, a position where it has been determined that the user gazed at a space, or a position where the user performed a predetermined operation, and display the relevant still image on the display unit 32. When the detection information includes a screen shot, the output unit 342 may display the screen shot on the display unit 32. Here, the predetermined operation is an operation of swinging the head vertically as though the user is nodding, or an operation of the button which is the input unit 21 of the display apparatus 2, but it is not limited thereto. When a microphone (not shown), provided on the display apparatus 2, detects a predetermined sound, it may be assumed that the predetermined operation was performed. In this case, it is assumed that operation information indicating that the predetermined operation was performed is associated with the recognition result information.

Figure 5C:
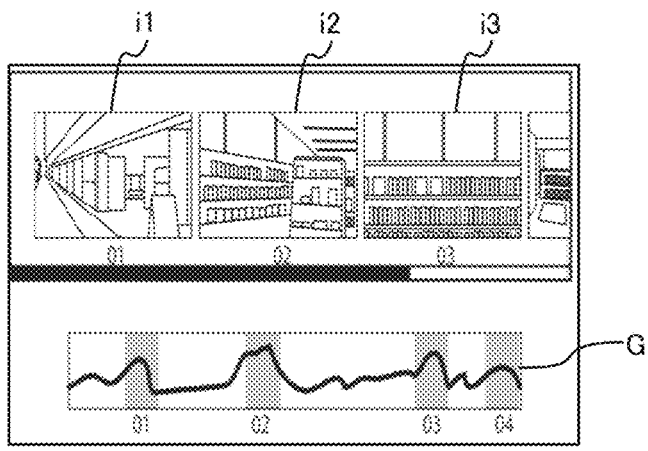

In addition, the output unit 342 may display information indicating the playback position of the VR video when the looking-around motion is detected on the graph G displayed on the display unit 32. In FIG. 5C, a character string of "01", "02", "03", and "04" is displayed as the information indicating the playback position of the VR video when the looking-around motion is detected (when the acceleration rate in the horizontal direction is equal to or greater than a predetermined amount). It should be noted that, when the display apparatus 2 detects the θ waves instead of the looking-around motion, the output unit 342 may display information indicating a playback position of the VR video at the timing when θ waves above a predetermined amplitude are detected on the graph G which is displayed on the display unit 32.

Further, among the pieces of information indicating the playback position of the video, the output unit 342 may use different display modes for displaying the information indicating the playback position at which the looking-around motion is detected and for displaying the information indicating the playback position at which the looking-around motion is not detected. For example, as shown in FIG. 5C, the output unit 342 displays a region corresponding to the character string of "01", "02", "03" and "04" which indicates the playback position where the looking-around motion is detected with a color different from the color of a region indicating the playback position where the looking-around motion is not detected. Further, as shown in FIG. 5C, the output unit 342 may cause the display unit 32 to display detection-time images i1, i2, and i3 indicating one or more images corresponding to the playback position at which the looking-around motion is detected among a plurality of images corresponding to the video. In this manner, the designer D who views a screen displayed on the display unit 32 can easily grasp a space in which the looking-around motion is detected among spaces corresponding to the VR video. It should be noted that, when the display apparatus 2 detects the θ waves instead of the looking-around motion, among the information indicating the playback position of the video, the output unit 342 may use different display modes for displaying information indicating the playback position where the θ waves above the predetermined amplitude are detected and for displaying information indicating the playback position where the θ waves above the predetermined amplitude are not detected.

Also, the output unit 342 may display, among a plurality of other images that are different from the VR video corresponding to the selected user ID, one or more images corresponding to an image of a playback position where the predetermined reaction in the VR video is detected. Here, the plurality other images may be a plurality of images corresponding to other VR videos, or a plurality of images stored in a database in advance. Further, the plurality of images stored in the database may be images that are extracted from another video in advance and stored in the database, images provided from databases in other companies' image posting/storage type services, or images provided as search results by a web search site, for example.

Further, one or more images corresponding to the image of the playback position where the predetermined reaction is detected are images showing a space serving as a proposal for improvement of the space included in the image, or images of when similar predetermined reactions are detected, for example. For example, the output unit 342 displays, near the detection-time images that correspond to the VR video corresponding to the selected user ID, a button for displaying detection-time images included in another VR video or the plurality of images stored in the database. The output unit 342 displays the detection-time images corresponding to another VR video or the database in response to pressing of the button. In this manner, the designer D can confirm the detection-time images in the plurality of VR videos, and grasp what kind of tendency the space in which the predetermined reaction such as the looking-around motion is detected has.

In addition, tag information indicating attributes of an image may be associated with each of the plurality of images included in the VR video. The tag information is position specifying information for specifying a type of a building shown in the image and a position inside the building, for example. The type of building is, for example, a detached house, a commercial facility, or the like. The position specifying information is, for example, information indicating an entrance, a corridor, a room, or the like.

The output unit 342 accepts a selection of the detection-time images, and accepts a pressing operation of the button for displaying detection-time images included in other VR videos. The output unit 342 displays one or more detection-time images corresponding to the tag information associated with the selected image among the detection-time images corresponding to the other VR videos. In this manner, the designer D can confirm an image highly likely to be similar to the detection-time images selected by the designer D himself/herself, and can grasp what kind of tendency the space in which the predetermined reaction such as the looking-around motion is detected has.

Further, when an image different from the detection-time images is displayed, the output unit 342 may display a button for selecting that image and displaying the detection-time images which are different from the selected image. The output unit 342 then displays one or more detection-time images corresponding to the tag information associated with the selected image. In this manner, the designer D can easily compare the image that is different from the detection-time images to the detection-time images, and can examine what kind of difference exists between the space in which the predetermined reaction such as the looking-around motion is detected and the space where no predetermined reaction is detected.

The output unit 342 may display, near the detection-time images, a button for displaying images similar to these detection-time images. Then, the output unit 342 may accept a selection of an image from among the detection-time images and accept a pressing operation of the button. The output unit 342 may display the images similar to the selected detection-time image. For example, the output unit 342 may search for images similar to the selected detection-time image in a plurality of other VR videos stored in the storage unit 33, or may input the selected detection-time image to an external search engine and cause the search engine to search for an image similar to the selected detection-time image.

Figure 5D:
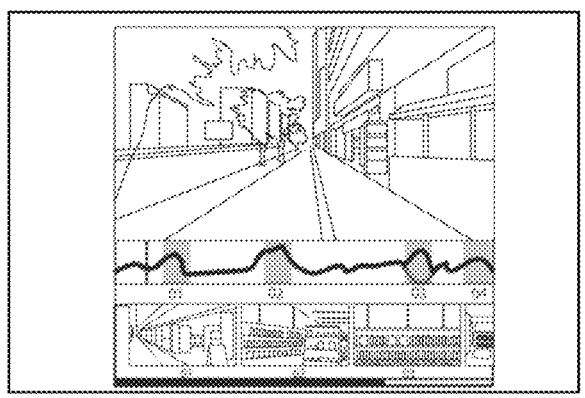

Further, as shown in FIG. 5D, the output unit 342 may cause the display unit 32 to display (i) the VR video, (ii) the graph G, which is the information indicating the detection state of the looking-around motion at each of the playback positions of the VR video, and (iii) one or more detection-time images corresponding to the playback positions at which the looking-around motions are detected, all at once.

[Display Examples of the Recognition Result Information of One or More Users]

The output unit 342 may receive at least any one of selections of one or more users U acquired by the acquisition unit 341, and may associate the VR space indicated by the VR space information with the detection information corresponding to the user U whose selection has been received, and may output the VR space information. FIGS. 6A to 6D each show a display example of the recognition result information of one or more users.

Figure 6A:
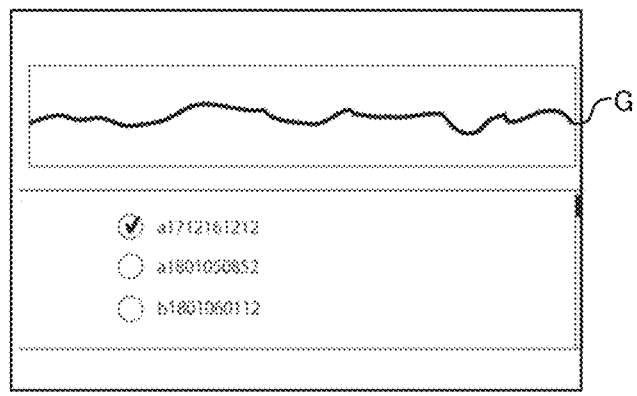
FIGS. 6A to 6D each show a display example of the recognition result information of one or more users.

For example, the output unit 342 displays the user IDs included in the detection information stored in the storage unit 33 on the display unit 32 as shown in FIG. 6A, and accepts a selection of one or more users U among the plurality of users U via the input unit 31.

Figure 6B:
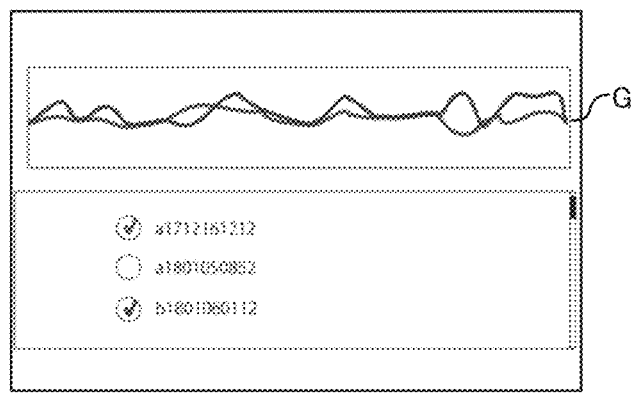

Then, the output unit 342 superimposes graphs G, which are information indicating the detection state of the looking-around motion and the gazing motion at each of the playback positions of the VR video, and displays them as recognition result information corresponding to each of the selected one or more users U. FIG. 6B shows a display example of the graphs G when two users U are selected. Since the graphs indicating the respective detected states of the looking-around motion of the two users U are superimposed and displayed as shown in FIG. 6B, the designer D can easily grasp at which playback position the looking-around motion tends to occur.

Figure 6C:
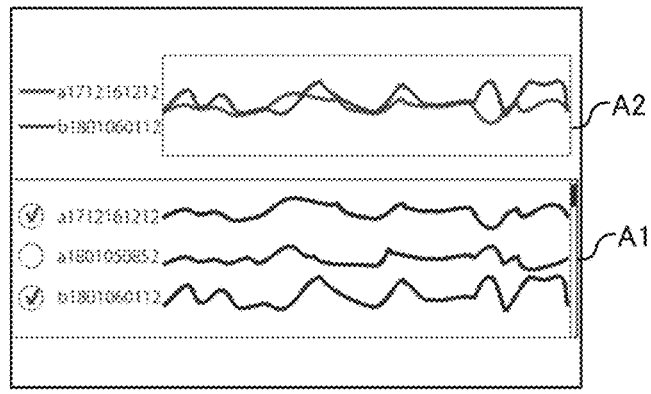

Also, the output unit 342 may display the detection information corresponding to each user ID included in the detection information stored in the storage unit 33 in a first area A1 of the display unit 32, and may superimpose and display detection results corresponding to the selected user IDs in a second area A2 of the display unit 32, as shown in FIG. 6C.

In addition, the output unit 342 may cause the display unit 32 to display (i) information indicating predictions of the user's looking-around motion and gazing motion predicted by the designer D or the like and (ii) the detection information corresponding to the selected user IDs, at the same timing. In this case, the acquisition unit 341 acquires, via the input unit 31, prediction information indicating a playback position at which the user U is predicted to make the looking-around motion and the gazing motion when the user U watches the VR video. For example, a playback position corresponding to a place, from where scenery similar to the scenery that the user viewed when the looking-around motion and the gazing motion were actually made can be viewed, is predicted as a playback position where the looking-around motion and the gazing motion are to be made. The prediction information is information in which (i) playback position information indicating each playback position and (ii) a detection state (acceleration rate in the horizontal direction) predicted at each playback position are associated with each other.

Figure 6D:
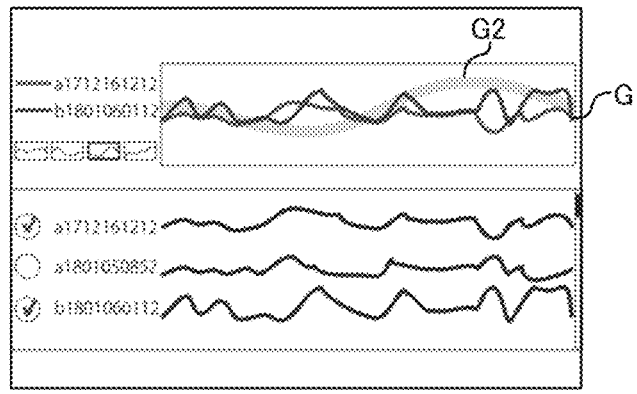

The output unit 342 superimposes and displays (i) the graphs G, which are information indicating the detection state of the looking-around motion at each of the playback positions of the VR video, and (ii) a graph G2, which is information indicating a prediction result of the looking-around motion at each of the playback positions of the VR video, as shown in FIG. 6D. In this manner, the designer D can examine spaces by comparing a prediction state of the looking-around motion with the detection state of the actual looking-around motion.

The acquisition unit 341 may acquire (i) first detection information which is detection information when the user U views a first VR space and (ii) second detection information which is detection information when the user U views a second VR space, which is different from the first VR space. The output unit 342 may display the first detection information and the second detection information on the display unit 32, at the same timing. For example, the first VR space is a building before renovation and the second VR space is the building after renovation. Further, the first VR space may be a first proposal for a building, and the second VR space may be a second proposal for the building.

For example, the output unit 342 may display the first detection information and the second detection information in parallel or superimposed one over the other on the display unit 32. In addition, the output unit 342 may display, on the display unit 32, both (i) detection-time images of the first VR video corresponding to the playback positions at which the looking-around motions indicated by the first detection information are detected and (ii) detection-time images of the second VR video corresponding to the playback positions at which the looking-around motions indicated by the second detection information are detected. In this manner, the designer D can examine the circumstances under which the looking-around motion is detected while he/she confirms the detection state of the looking-around motions in the space before and after renovation or in the spaces corresponding to the respective proposals, for example.

Further, it is considered that the user U's perception of the space included in the VR space differs when a detecting pattern of the looking-around motion differs. Therefore, the storage unit 33 may store information indicating user's emotions corresponding to a plurality of detecting patterns of the looking-around motion in advance. The output unit 342 may specify any one of the detecting patterns stored in the storage unit 33 by analyzing the detection information. Then, information indicating the user's emotions corresponding to the specified detecting pattern may be output in association with the detection information. In this manner, the designer D can grasp what kind of emotions the user U has for the VR space.

[Reflecting the Detection Results in the Map Information]

Figure 7:
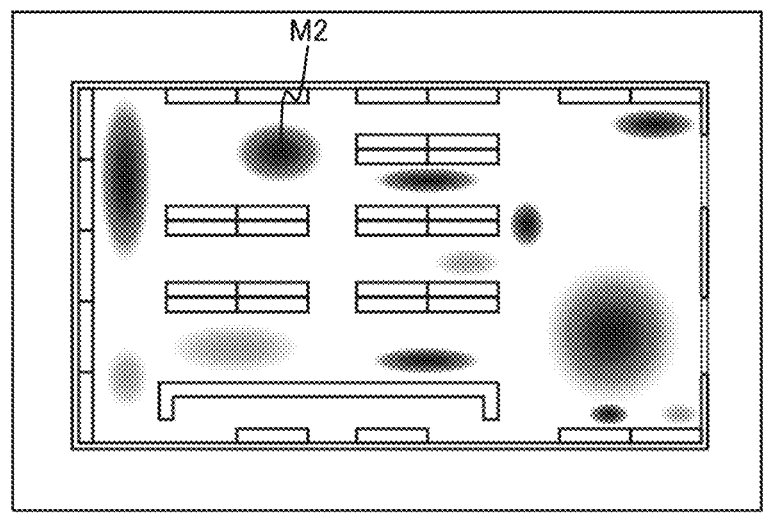
FIG. 7 shows a display example of a map corresponding to a VR space.

The output unit 342 may specify a position in the VR space when the looking-around motion of the user U is detected. The acquisition unit 341 acquires map information indicating the VR space in advance, and causes the storage unit 33 to store the map information. The output unit 342 displays information indicating the specified position on a map indicated by the map information stored in the storage unit 33. FIG. 7 shows a display example of a map corresponding to the VR space.

When the user U views the VR space by freely moving around the VR space, the output unit 342 displays the information indicating the detection state at a position of the VR space indicated by the map corresponding to the VR space on the basis of both (i) the position information indicating the position of the VR space included in the detection information and (ii) the detection state of the looking-around motion or the gazing motion at this position. For example, the output unit 342 displays a mark M2 indicating the detection state in the map corresponding to the VR space. In this manner, the designer D can easily confirm the position at which the looking-around motion or the gazing motion is detected, as shown in FIG. 7.

Here, the map shown in FIG. 7 may display the user U's movement trajectories in the VR space. Further, layouts of objects such as furniture, product shelves, and signs (signboards) to be arranged in the VR space may be accepted from the designer D in advance. The output unit 342 may display marks indicating the objects on the map shown in FIG. 7 on the basis of the layouts of the objects to be arranged in the VR space.

When making the user U watch the VR video, the playback position information indicating the playback position of the VR video and the position information indicating the position of the VR space corresponding to the VR video may be stored in the storage unit 33 in association with each other. The output unit 342 specifies a playback position of the VR video when the looking-around motion of the user U is detected on the basis of the detection information corresponding to the VR video. The output unit 342 specifies a position of the VR space corresponding to the playback position and the detection state at the position by referencing the storage unit 33, specifying the position information associated with the playback position information indicating the specified playback position, and specifying the detection state associated with the playback position information. The output unit 342 displays information indicating the detection state at the specified position in the map indicated by the map information stored in the storage unit 33.

The output unit 342 may display (i) the VR video and the graphs G shown in FIGS. 5B to 5D and (ii) the map corresponding to the VR space shown in FIG. 7 in parallel, and display information indicating the position in the VR space corresponding to the playback position on the map. By displaying the VR video and the map in parallel, the designer D can easily confirm the position corresponding to the VR video.

[Relationship Between Brain Waves and the Looking-Around Motion]

Figure 8A:
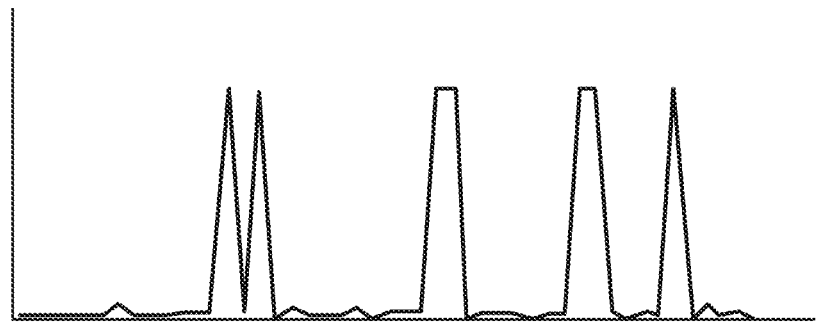
FIGS. 8A and 8B respectively show a detection state of $\theta$ waves of the user who watched a VR video and a detection state of head-swinging motion as looking-around motion.
Figure 8B:
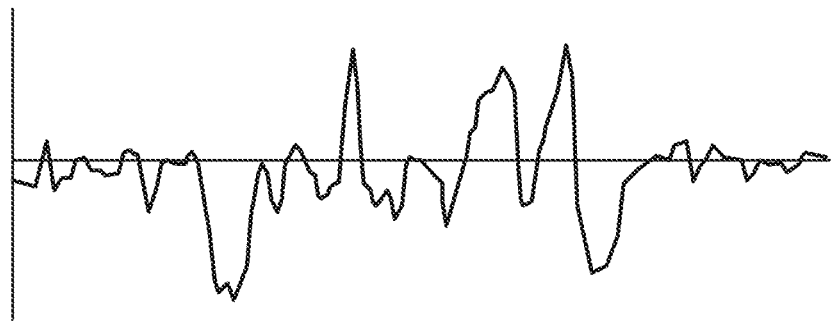

Next, a relationship between brain waves and the looking-around motion and gazing motion will be described. FIGS. 8A and 8B respectively show the detection state of θ waves of the user who watched the VR video and the detection state of his/her head-swinging motion serving as the looking-around motion. FIG. 8A shows the detection state of the θ waves, and FIG. 8B shows the detection state of the head-swinging motion and the gazing motion. It is assumed that the horizontal axis of the graph shown in FIG. 8A and the horizontal axis of the graph shown in FIG. 8B are each a common time axis. Further, the vertical axis shown in FIG. 8A indicates the magnitude of θ waves, the vertical axis shown in FIG. 8B indicates the acceleration rate in the horizontal direction. As shown in FIGS. 8A and 8B, it can be confirmed that the detection state of the head-swinging motion and the gazing motion greatly changes in accordance with the detection of the θ waves, and a correlation is found between (i) the θ waves and (ii) the head-swinging motion and gazing motion.

Variation Example

The detection information generating unit 253 may generate the detection information on the basis of a predetermined reaction detected in a state where the user is not walking. In this case, when there are many looking-around motions, the information output apparatus 3 outputs a result of an evaluation of a room or the like showing that the room is in an unstable state with many spatial articulations on the basis of the correlation between the looking-around motion and brain waves detected in a series of actions while the user is seated, for example. Also, when there are many gazing motions such that his/her line of sight moves slowly and not as fast as the saccade, the information output apparatus 3 may output a result of an evaluation of a room or the like showing that the room is in a stable state with few spatial articulations.

In the above explanation, cases where the design support system S uses the generation of the θ waves as the predetermined reaction were illustrated as examples, but brain waves other than the θ waves may be used. For instance, a waves, which indicate relaxation, often show a value equal to or greater than a predetermined value when the looking-around motions are repeated at predetermined time intervals. Therefore, the information output apparatus 3 may estimate that the user is in a relaxed state on the basis of only the looking-around motion. Further, since P waves, which indicate a concentration degree, often show a value equal to or greater than a predetermined value when a certain amount of time or more has passed during the gazing motion, the information output apparatus 3 may estimate that the user is in a concentrated state on the basis of only the gazing motion.

Effect of the First Embodiment

As described above, the information output apparatus 3 according to the first embodiment acquires the detection information indicating the detection state of the predetermined reaction of the user when he/she views the VR space, and outputs the VR space information and the acquired detection information in association with each other. Since (i) the looking-around motion or the generation of the θ waves, which are the predetermined reactions in the space, and (ii) the spatial recognition state are correlated, when the information output apparatus 3 outputs the VR space information and the acquired detection information in association with each other, the designer who confirms these information can grasp the user's perception of the space.

Second Embodiment

[Releasing the Recognition Result Information to the Public]

Next, a second embodiment will be described. In the first embodiment, the designer D designing the space confirms the recognition result information, and the recognition result indicated by the recognition result information is also useful for a resident or the like of a house who is considering an indoor layout such as an arrangement of furniture in the space. Therefore, an information output apparatus 3 according to the second embodiment differs from that of the first embodiment in that it provides public services for releasing the recognition result information to the public. Hereinafter, the information output apparatus 3 according to the second embodiment will be described. The descriptions of the same portions as those of the first embodiment are omitted, as appropriate.

Figure 9:
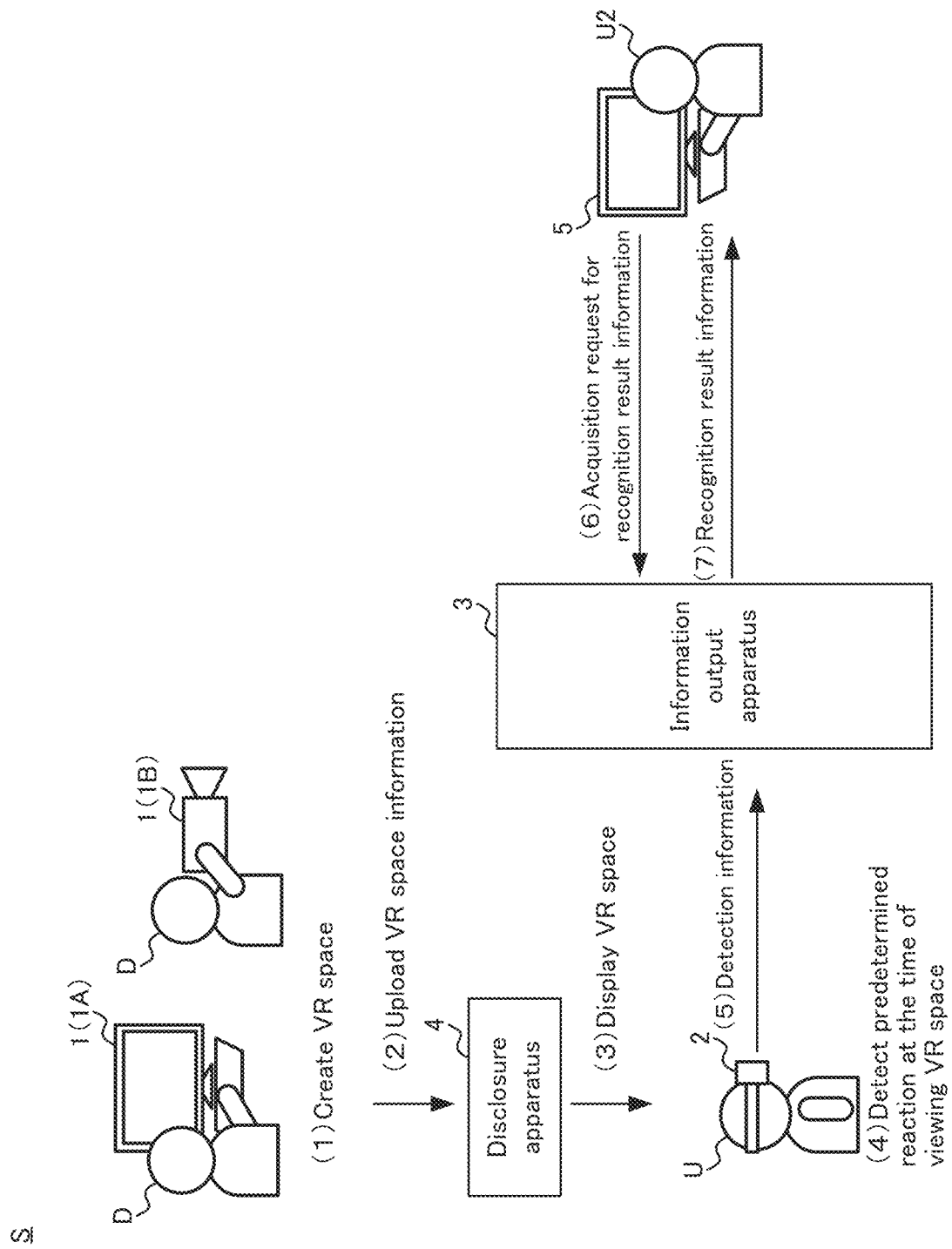
FIG. 9 shows an outline of a design support system according to a second embodiment.

FIG. 9 shows an outline of a design support system S according to the second embodiment. In the second embodiment, the information output apparatus 3 is a server, for example, and is connected to a terminal 5 in a manner enabling communication, the terminal 5 being used by a second user U2. Here, the second user U2 of the terminal 5 is a user of the public services that release the recognition result information to the public. In the second embodiment, the information output apparatus 3 outputs the recognition result information to the terminal 5. Processing from (1) to (5) illustrated in FIG. 9 is the same as the processing of the design support system S according to the first embodiment shown in (1) to (5) illustrated in FIG. 1. In the design support system S according to the second embodiment, the recognition result information is output in response to the information output apparatus 3 accepting an acquisition request for the recognition result information from the terminal 5 (see (6) and (7) illustrated in FIG. 9).

Figure 10:
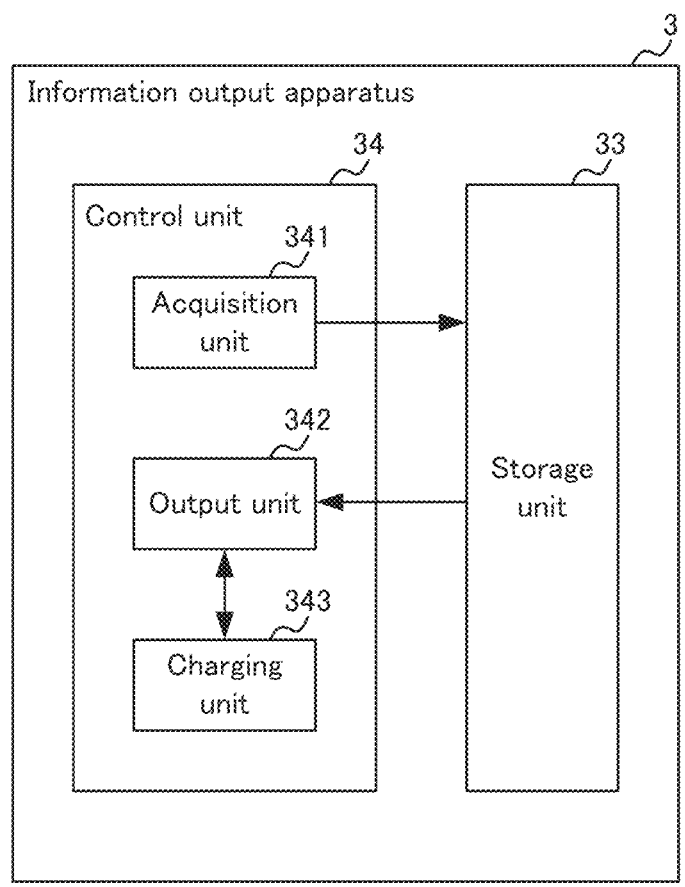
FIG. 10 shows a configuration of an information output apparatus according to the second embodiment.

FIG. 10 shows a configuration of the information output apparatus 3 according to the second embodiment. The information output apparatus 3 according to the second embodiment differs from the information output apparatus 3 according to the first embodiment in that it does not include the input unit 31 and the display unit 32. Also, the control unit 34 of the information output apparatus 3 according to the second embodiment further includes a charging unit 343, and the information output apparatus 3 according to the second embodiment differs from the information output apparatus 3 according to the first embodiment in this point.

In the second embodiment, the information output apparatus 3 accepts a setting of whether or not to permit the release of the recognition result information and the VR space information from concerned persons (for example, the designer D or an administrator) of the VR space information corresponding to the recognition result information. The information output apparatus 3 associates the recognition result information stored in the storage unit 33 with a permission flag indicating whether or not to permit the release to the public. A value of the permission flag is 1 when the release of the recognition result information and VR space information is permitted, and is 0 when it is not permitted, for example.

The charging unit 343 charges the second user U2, who uses the terminal 5, a fee for outputting the recognition result information. For example, the charging unit 343 may set a fee for outputting the recognition result information in a predetermined period as a flat rate, and charge the second user U2 the flat rate for every predetermined period. Further, the fee may be charged after the recognition result information is output. Here, the charging unit 343 may return at least a part of the proceeds obtained by the charging of the fee to concerned persons of the VR space information corresponding to the recognition result information.

In the second embodiment, the output unit 342 accepts an acquisition request for the recognition result information stored in the storage unit 33 from the terminal 5 used by the second user U2 when the charging of the fee by the charging unit 343 is completed, for example. For example, the output unit 342 presents some of the images or the space identification information indicating the VR spatial information corresponding to one or more pieces of recognition result information which are permitted to be released to the public, and accepts an acquisition request for at least any one piece of recognition result information from among the one or more pieces of recognition result information. Upon accepting the acquisition request for the recognition result information, the output unit 342 outputs at least one of the screens shown in FIGS. 5B to 5D as the recognition result information to the terminal 5.

Here, the charging unit 343 may change the amount to be charged depending on an output form of the recognition result information to the terminal 5. For example, when outputting the screen shown in FIG. 5B, the charging unit 343 may charge a first amount or not charge any amount.

Further, when outputting the screen shown in FIG. 5C or FIG. 5D, the charging unit 343 may charge a second amount which is higher than the first amount because the screen shown in FIG. 5C or FIG. 5D is considered to be more convenient than the case of outputting the screen shown in FIG. 5B.

Further, when the user uses a function of searching for a detection-time image corresponding to another VR space information or searching for an image similar to the detection-time image in FIG. 5C or FIG. 5D, the charging unit 343 may charge a third amount which is higher than the second amount because using such a function is considered to be more convenient than the case of outputting the screen shown in FIG. 5C or FIG. 5D.

In some cases, the concerned persons of the VR space information corresponding to the recognition result information want to release only the detection-time image without releasing the VR video indicating the VR space information to the public. Therefore, the information output apparatus 3 may accept a selection of whether or not to release only the detection-time image when accepting the permission for the release from the concerned persons of the VR space information corresponding to the recognition result information, and cause the storage unit 33 to store information indicating contents of the selection in association with the recognition result information. In this case, the output unit 342 may control whether or not to output the screen shown in FIG. 5B on the basis of the information indicating the contents of the selection.

Effect of the Second Embodiment

As described above, since the information output apparatus 3 according to the second embodiment charges the second user U2, who uses the terminal 5, for the output of the recognition result information, it can obtain value for the output of the recognition result information. Further, since the information output apparatus 3 outputs, to the terminal 5, the VR space information corresponding to the recognition result information permitted to be released to the public, it is possible to prevent the recognition result information, which is not desired to be released to the public, from being released to the outside.

The present invention is explained on the basis of the exemplary embodiments. The technical scope of the present invention is not limited to the scope explained in the above embodiments and it is possible to make various changes and modifications within the scope of the invention. For example, in the embodiment described above, the display apparatus 2 is the wearable device, such as the VR goggle or the VR headset, that allows the user to browse the VR space, but it is not limited to this. The display apparatus 2 may be an augmented reality projection apparatus that projects a VR space onto real space. In this case, the information output apparatus 3 may acquire, as the detection information of the looking-around motion or the gazing motion, an acceleration rate detected by a detection device including an acceleration detection sensor that detects the acceleration rate when the VR space is projected onto real space by having a user wear the detection device.

In the above embodiment, the embodiment has been described in which the user views the VR space, but the present embodiment is not limited to this, and the present embodiment may be applied to a case where the user views an AR space instead of the VR space. That is, the display apparatus 2 may generate detection information in which (i) the detection state of the user's predetermined reaction when the user views the AR space in which virtual objects are arranged in real space and (ii) a screen shot showing the AR space which the user was viewing when the predetermined reaction is detected are associated with each other, and transmit the detection information to the information output apparatus 3. The information output apparatus 3 may output information indicating the AR space in association with the detection information acquired from the information output apparatus 3. For example, the information output apparatus 3 may display, on the display unit 32, (i) the screen shot showing the AR space when the predetermined reaction is detected and (ii) information indicating that the user showed the predetermined reaction to the screen shot in association with each other.

The information output apparatus 3 may further include a determination unit that determines a position suitable for the placement of objects such as household appliances, furniture, foliage plants, and the like, and for the installation of signs such as a signboard and the like, on the basis of a position in the VR space at which the user U showed the predetermined reaction. For example, the information output apparatus 3 determines whether the position at which the user U showed the predetermined reaction is suitable for the placement of objects on the basis of the size of the space corresponding to the position. The determination unit may determine a position immediately before or after the user U shows the predetermined reaction, that is, a position of a gap in space, as the position suitable for the installation of the signs.

Further, the information output apparatus 3 determines whether or not the position is suitable for the placement of objects on the basis of a viewing frequency of each of a plurality of positions at which the user U showed the predetermined reaction. For example, the information output apparatus 3 determines that a position having a higher viewing frequency, among a plurality of positions at which the user U reacted with the gazing motion among the predetermined reactions, is a position suitable for designer furniture. In addition, the information output apparatus 3 determines that a position having a low viewing frequency, among a plurality of positions where the user U reacted with the looking-around motion among the predetermined reactions, is a position suitable for the placement of furniture with an unsophisticated design.

Further, the information output apparatus 3 may determine whether a position where the user U does not show any predetermined reaction is a position suitable for the placement of objects. In this case, the information output apparatus 3 may determine whether a position is suitable for the placement of objects on the basis of the viewing frequency of the position. The information output apparatus 3 may cause the display unit 32 to display the position determined to be suitable for the placement of objects as a candidate position for the placement of objects.

Further, the information output apparatus 3 may generate a VR space in which a virtual object is placed at the candidate position for the placement of objects, and output the video of the VR space and a video of a VR space in which no virtual object is placed in a comparable manner. Further, the information output apparatus 3 may specify a predetermined reaction when the user U views the VR space in which the virtual object is placed and a predetermined reaction when the user U views the VR space in which no virtual object is placed, and evaluate the spaces on the basis of the predetermined reactions. In this manner, the information output apparatus 3 can support placement of the objects.

In the embodiment described above, the design support system S is described as a system for supporting the designing of a space related to a building, but it is not limited to this. For example, it may support designing of a virtual space in games. As an example, as shown in FIGS. 5B to 5D, the information output apparatus 3 reproduces and outputs the VR video, but it is not limited to this. The control unit 34 of the information output apparatus 3 may function as an accepting unit, and accept comments and annotations from the user of the information output apparatus 3 for the respective playback positions. The control unit 34 may cause the storage unit 33 to store the received comments and annotations and the playback positions of the VR video, and associate the received comments and annotations with the playback positions and display them when the VR video is replayed. In this manner, the designer D can grasp what kind of impressions the user of the information output apparatus 3 who browsed the VR video has with respect to the space in the VR video.

For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. An information output apparatus comprising:
an acquisition unit that acquires detection information in which (i) a detection of θ waves which are brain waves that are correlated with a user's perception of a space and are generated in the user when the user watches a video showing a predetermined space which is a virtual reality space or an augmented reality space and (ii) information indicating a playback position of the video are associated with each other;
an output unit that outputs (i) the video showing the predetermined space and (ii) a graph indicating the detection of the θ waves for each playback position of the video in association with each other, and outputs information indicating a current playback position of the video at the timing when the θ waves above a predetermined amplitude are detected on the graph; and
a determination unit that determines that a position in the predetermined space corresponding to a timing immediately before or after the detection of the θ waves is suitable for installing an object or a sign.

2. The information output apparatus according to claim 1, wherein the output unit displays information indicating a playback position at which the θ waves are detected using a display mode different from a display mode for information indicating a playback position at which the θ waves are not detected, among the pieces of information indicating the playback position of the video.

3. The information output apparatus according to claim 1, wherein the output unit causes a display unit to display one or more images corresponding to the playback position at which the θ waves are detected among the plurality of images corresponding to the video.

4. The information output apparatus according to claim 1, wherein the output unit displays, among a plurality of images that are different from the images included in the video, one or more images corresponding to an image of a playback position where the θ waves in the video are detected.

5. The information output apparatus according to claim 1, wherein the output unit accepts a selection of an image from among one or more images corresponding to one or more playback positions at which the θ waves are detected, and displays an image similar to the selected image.

6. The information output apparatus according to claim 1, wherein the output unit specifies a position of the user in the predetermined space when the θ waves are detected, and displays information indicating the specified position on a map showing the predetermined space.

7. The information output apparatus according to claim 1, wherein the acquisition unit acquires the detection information corresponding to each of a plurality of the users, and the output unit outputs (i) information indicating the predetermined space and (ii) detection information corresponding to each of the plurality of users acquired by the acquisition unit, in association with each other.

8. The information output apparatus according to claim 7, wherein the output unit accepts a selection of at least one of a plurality of the users, and outputs (i) information indicating the predetermined space and (ii) detection information corresponding to the selected user, in association with each other.

9. The information output apparatus according to claim 1, wherein the acquisition unit acquires prediction information indicating a playback position of the video where the θ waves are predicted to be detected when the user watches the video showing the predetermined space, and
the output unit causes a display unit to display the detection information acquired by the acquisition unit and the predicted information.

10. The information output apparatus according to claim 1, wherein the acquisition unit acquires first detection information, which is the detection information when the user views a first predetermined space, and second detection information, which is the detection information when the user views a second predetermined space, and
the output unit causes a display unit to display the first detection information and the second detection information acquired by the acquisition unit.

11. The information output apparatus according to claim 1, further comprising
a storage unit that stores information indicating the user's emotions corresponding to a plurality of detecting patterns of the θ waves, wherein
the output unit outputs information indicating the user's emotions corresponding to detecting patterns included in the detection information.

12. The information output apparatus according to claim 1, wherein the acquisition unit causes the storage unit to store, in association with each other, (i) result information, in which information indicating each of a plurality of the predetermined spaces and the acquired detection information are associated with each other, and (ii) information indicating whether or not to release the result information to the public, and
the output unit outputs the result information to a terminal upon accepting, from the terminal, an acquisition request for the result information to be released, the acquisition request being stored in the storage unit.

13. The information output apparatus according to claim 12, further comprising
a charging unit that charges the user of the terminal for outputting of the result information.

14. The information output apparatus according to claim 1, wherein
the acquisition unit acquires the detection information in which (i) the detection of the θ waves and (ii) the information indicating the playback position of the video are associated with each other, when a device capable of detecting brain waves of the user detects the θ waves or when an operation of a computer is detected, the operation of the computer being stored in a database storing operations of the computer conducted by the user viewing the virtual reality space or the augmented reality space at a timing when the θ waves were detected.

15. The information output apparatus according to claim 1, wherein
the output unit causes a display unit to display the position determined as being suitable for installing the object or the sign.

16. An information output method comprising:
acquiring detection information in which (i) a detection of θ waves which are brain waves that are correlated with a user's perception of a space and are generated in the user when the user watches a video showing a predetermined space which is a virtual reality space or an augmented reality space and (ii) information indicating a playback position of the video are associated with each other;
outputting (i) the video showing the predetermined space and (ii) a graph indicating the detection of the θ waves for each playback position of the video in association with each other, wherein information indicating a current playback position of the video at the timing when the θ waves above a predetermined amplitude are detected is output on the graph; and
determining that a position in the predetermined space corresponding to a timing immediately before or after the detection of the θ waves is suitable for installing an object or a sign,
that are executed by a computer.

17. The information output method according to claim 16, further comprising displaying the position determined as being suitable for installing the object or the sign on a display unit.

18. A design support system comprising:
a display apparatus worn by a user; and
an information output apparatus, wherein
the display apparatus has
a display unit,
a display control unit that causes the display unit to display a predetermined space which is a virtual reality space or an augmented reality space, and
a detection information generating unit that generates detection information in which (i) a detection of θ waves which are brain waves that are correlated with the user's perception of a space and are generated in the user when the user watches a video showing the predetermined space and (ii) information indicating a playback position of the video are associated with each other, and the information output apparatus has,
an acquisition unit that acquires the detection information generated by the detection information generating unit, an output unit that outputs (i) the video showing the predetermined space and (ii) a graph indicating the detection of the θ waves for each playback position of the video in association with each other, and outputs information indicating a current playback position of the video at the timing when the θ waves above a predetermined amplitude are detected on the graph, and a determination unit that determines that a position in the predetermined space corresponding to a timing immediately before or after the detection of the θ waves is suitable for installing an object or a sign.

19. The design support system according to claim 18, wherein the output unit causes the display unit to display the position determined as being suitable for installing the object or the sign.

\* \* \* \* \*